(12) United States Patent
Alessandrini et al.

(10) Patent No.: US 7,669,644 B2
(45) Date of Patent: Mar. 2, 2010

(54) HEAT EXCHANGER, IN PARTICULAR OF THE CONDENSATION TYPE

(75) Inventors: Alberto Alessandrini, Meldola (IT); Andrea Alessandrini, Meldola (IT)

(73) Assignee: COSMOGAS S.r.l., Meldola (FC) (IT)

( * ) Notice: Subject to any disclaimer, the term of this patent is extended or adjusted under 35 U.S.C. 154(b) by 0 days.

(21) Appl. No.: 11/459,470

(22) Filed: Jul. 24, 2006

(65) Prior Publication Data
US 2007/0000653 A1   Jan. 4, 2007

Related U.S. Application Data

(63) Continuation of application No. PCT/IB2005/000097, filed on Jan. 14, 2005.

(30) Foreign Application Priority Data

Jan. 22, 2004   (IT) .......................... TO2004A0022

(51) Int. Cl.
F28D 7/02 (2006.01)
(52) U.S. Cl. .......................... 165/163; 165/76; 165/162
(58) Field of Classification Search ........ 165/DIG. 432, 165/76, 83, 103, 110, 135, 140, 158, 162, 165/163; 122/32, 34, 209.1, 250 R; 228/171; 158/7
See application file for complete search history.

(56) References Cited

U.S. PATENT DOCUMENTS

| | | | |
|---|---|---|---|
| 1,091,369 A * | 3/1914 | Mejani ........................ 165/163 |
| 1,796,944 A * | 3/1931 | Jones ........................... 165/82 |
| 1,825,433 A * | 9/1931 | White ........................... 165/72 |
| 3,332,477 A * | 7/1967 | Saunders ...................... 165/76 |
| 3,570,458 A * | 3/1971 | Sato et al. ..................... 122/34 |
| 3,809,061 A   | 5/1974 | Gerstmann ................... 126/350 |
| 3,912,151 A * | 10/1975 | Martin et al. ............... 228/171 |
| 4,062,401 A * | 12/1977 | Rudny et al. ................. 165/125 |
| 4,136,735 A * | 1/1979 | Beck et al. ................... 165/125 |
| 4,313,491 A * | 2/1982 | Molitor ........................ 165/83 |
| 4,357,910 A * | 11/1982 | Blockley et al. ............ 122/248 |
| 4,382,425 A * | 5/1983 | Boyes ....................... 122/367.1 |
| 4,621,592 A * | 11/1986 | McInerney ............. 122/250 R |
| 4,901,677 A   | 2/1990 | Demetri ....................... 122/235 |
| 4,981,171 A * | 1/1991 | Tippmann ................... 165/125 |
| 5,078,206 A * | 1/1992 | Goetz, Jr. ..................... 165/125 |
| 5,687,678 A   | 11/1997 | Suchomel et al. ........... 122/250 |
| 5,845,609 A * | 12/1998 | Corrigan ................... 122/209.1 |

* cited by examiner

*Primary Examiner*—Ljiljana (Lil) V Ciric
(74) *Attorney, Agent, or Firm*—Heslin Rothenberg Farley & Mesiti P.C.; Victor A. Cardona, Esq.

(57) ABSTRACT

A heat exchanger comprises a casing, within which there is present a first pipe wound in a spiral, in which a first fluid flows, the casing being designed to receive a second fluid that is in heat-exchange relationship with the first fluid. The heat exchanger further comprises at least one second pipe wound in a spiral, which connects, in parallel to the first pipe, two gaps formed in the casing, the spiralled pipes being arranged in a coaxial way and at a distance from one another, and having different sections of passage.

37 Claims, 8 Drawing Sheets

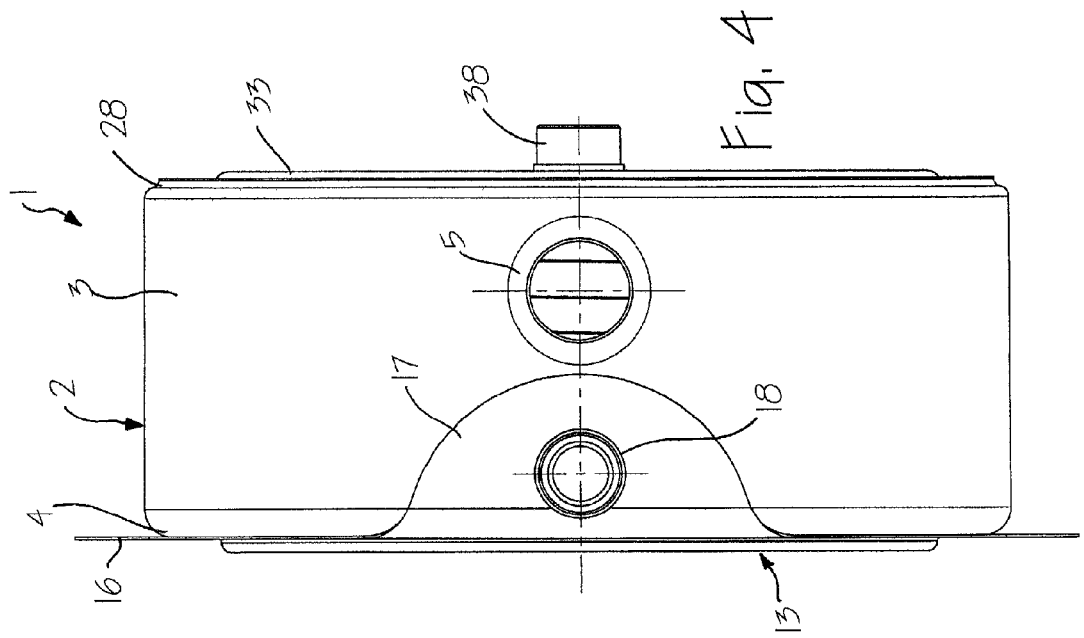
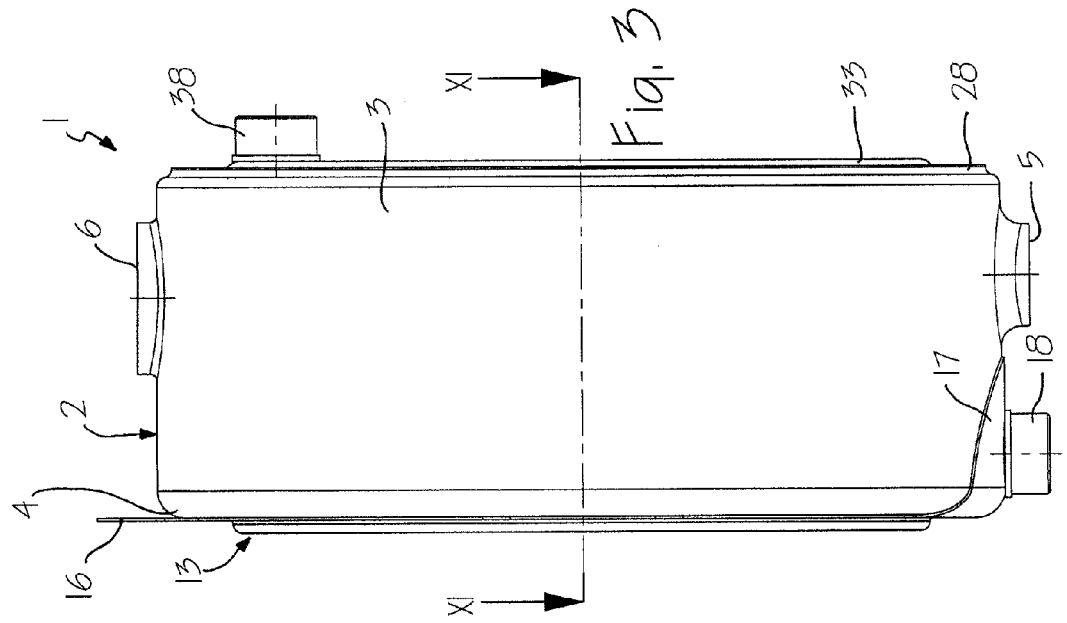

US 7,669,644 B2

HEAT EXCHANGER, IN PARTICULAR OF THE CONDENSATION TYPE

CROSS REFERENCE TO RELATED APPLICATIONS

This application is a Continuation of PCT International Application No. PCT/IB2005/000097, filed on Jan. 14, 2005, and published in English on Sep. 1, 2005, as WO 2005/080900 A2, which claims priority to Italian Patent Application No. TO 2004A000022, filed Jan. 22, 2004, the entire disclosures of which are incorporated herein by reference.

FIELD OF THE INVENTION

The present invention relates to a heat exchanger, in particular of the condensation type.

BACKGROUND OF THE INVENTION

As is known, the function of a heat exchanger is to transfer thermal energy between two fluids. For example, in the case of the widely used domestic gas boilers, the function of the heat exchanger is to heat water circulating inside it, starting from hot fumes that result from combustion produced by a burner. Said condensation boilers are devised for said purpose in order to exploit both heat that develops following upon combustion and latent heat of condensation contained in the combustion fumes. Heat contained in the fumes can be recovered via a heat exchanger comprising a shell or casing, inside which is set a pipe for circulation of water, against which the fumes are made to flow.

The amount of condensation that is recovered mainly depends upon the temperature of delivery and return of the water in the heat exchanger, with respect to the heating system. Furthermore, to obtain a considerable heat exchange between the fluids inside and outside the pipe of the heat exchanger, it is necessary to have a surface of heat exchange as extensive as possible. For this purpose, the pipe is usually constituted by a tube bent to form a coil, positioned in the casing of the heat exchanger so as to surround the burner.

In order to have available a high surface of heat exchange the coiled pipe must, however, be rather long, and this at the expense of the requirement of rendering the dimensions of the heat exchanger as a whole compact. Said drawback can be reduced by shaping the tube that forms the coiled pipe with a section of passage having parallel plane surfaces. If on the one hand said solution enables a good heat exchange to be obtained even with a coil that is not too long, on the other hand it involves a greater complexity of construction of the heat exchanger, with a consequent increase in its cost.

Another drawback of known heat exchangers is that they must be adequately insulated thermally, for example to prevent excessive heating of the body of the boiler. The need to reduce the temperature of the casing of the heat exchanger in this way involves the use of insulators, which further complicate the construction of the heat exchanger, as well as its disposal at the end of its useful working life.

SUMMARY OF THE INVENTION

In the light of the foregoing considerations, the purpose of the present invention is to provide a new-concept heat exchanger, which presents efficiency of operation, compact dimensions and is industrially simple and economically advantageous to produce.

With a view to achieving said purpose, the subject of the invention is a heat exchanger, particularly of the condensation type, having the characteristics indicated in the attached claims, which are understood as forming an integral part of the present description.

BRIEF DESCRIPTION OF THE DRAWINGS

Further purposes, characteristics and advantages of the invention will emerge from the ensuing description with reference to the annexed plate of drawings, provided purely by way of non-limiting example, in which:

FIGS. 3 and 4 are two side views of the heat exchanger of FIGS. 1 and 2;

DESCRIPTION OF PREFERRED EMBODIMENTS OF THE INVENTION

Figure 2:
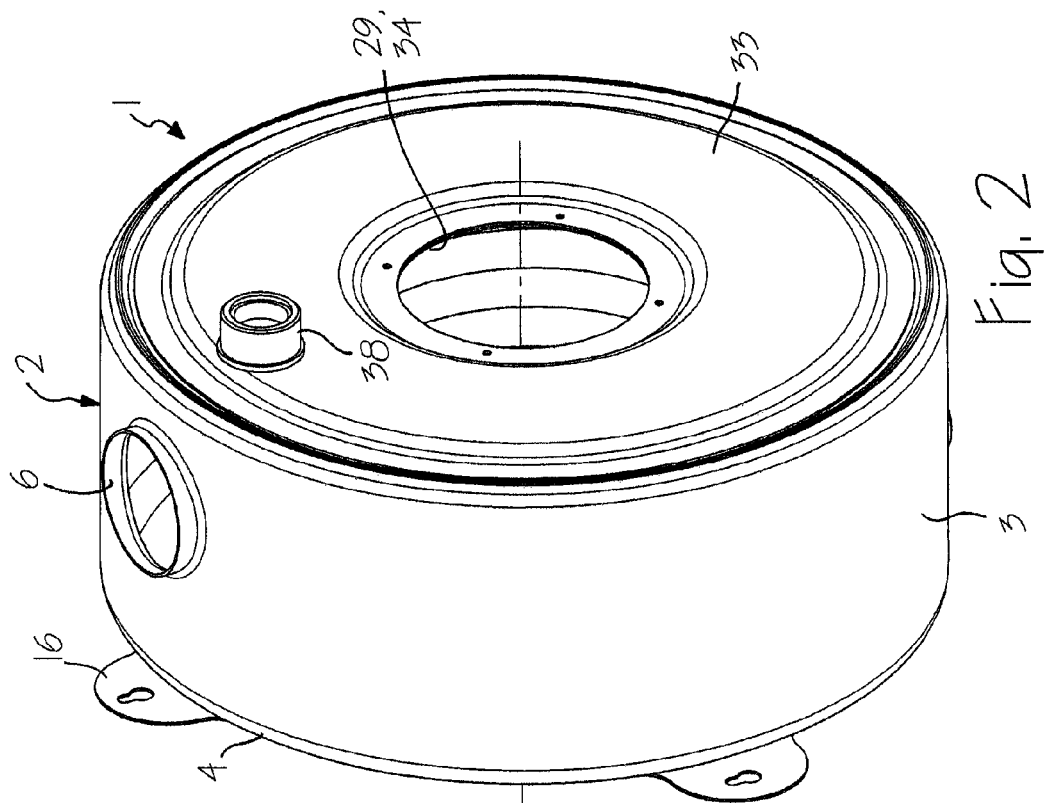
FIGS. 1 and 2 are two perspective views of the heat exchanger according to the invention.
Figure 1:
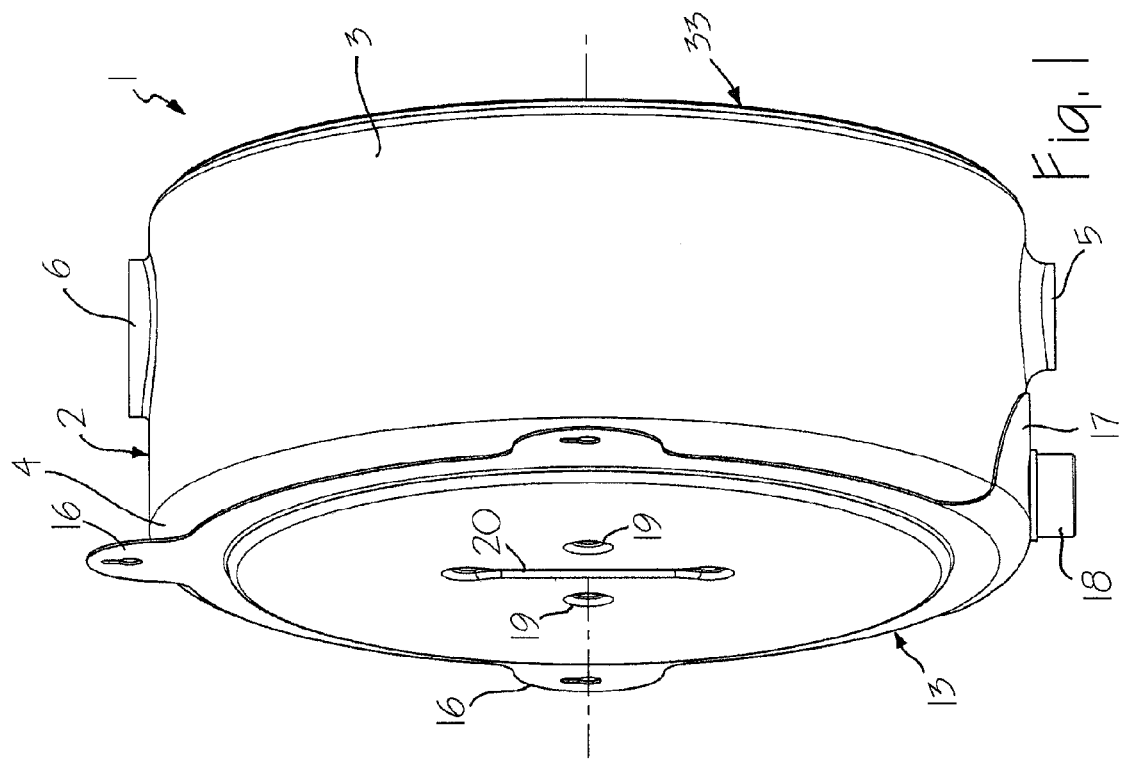
Figure 5:
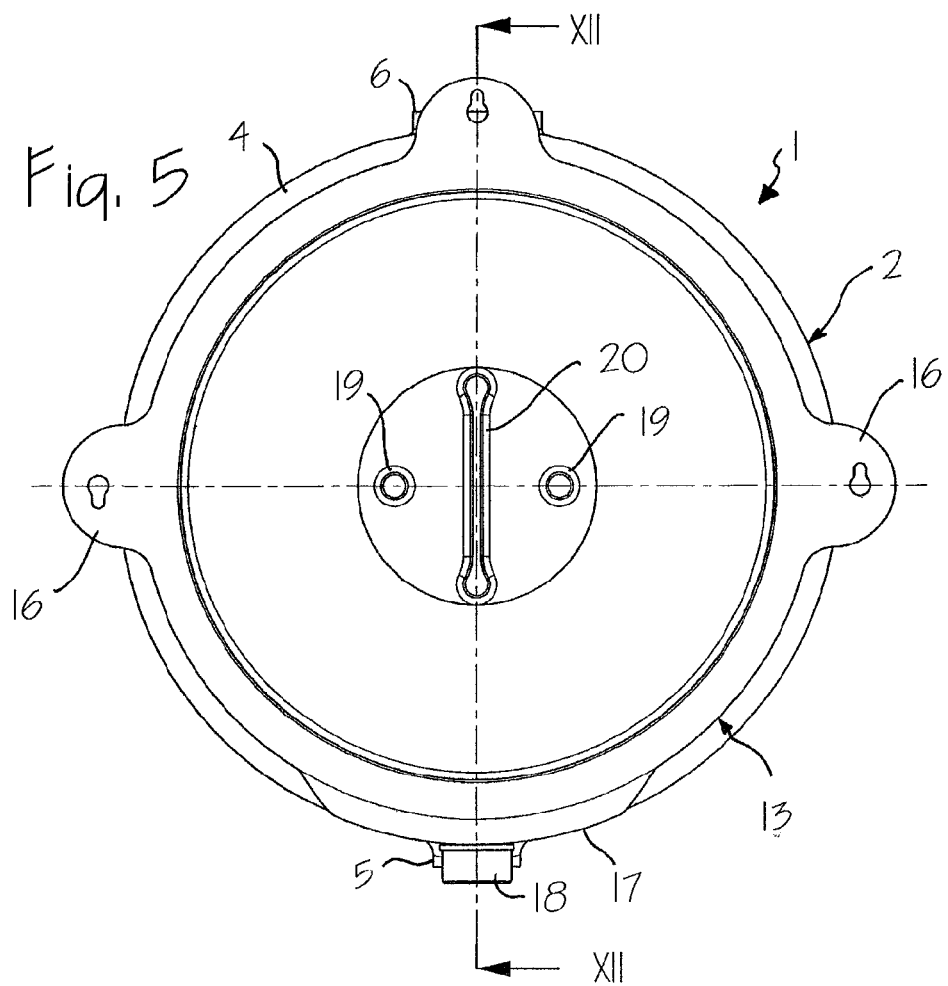
FIG. 5 is a plan view of the heat exchanger of FIGS. 1 and 2.

In the figures, reference number 1 indicates as a whole a heat exchanger, in particular of the condensation type for a gas boiler, built according to the present invention.

The heat exchanger 1 comprises a bell-like casing 2 made of thermally conductive material, preferably stainless steel, obtained by deformation of sheet metal, via operations of shearing, drawing, and pressing.

The casing 2 has a substantially cylindrical circumferential wall 3 and an end wall 4. In diametrally opposite areas of the wall 3 there are formed, once again by operations of drawing and shearing, a condensate-outlet connector 5 and a fume-outlet connector 6, which extend radially with respect to the axis of the casing 2.

Figure 6:
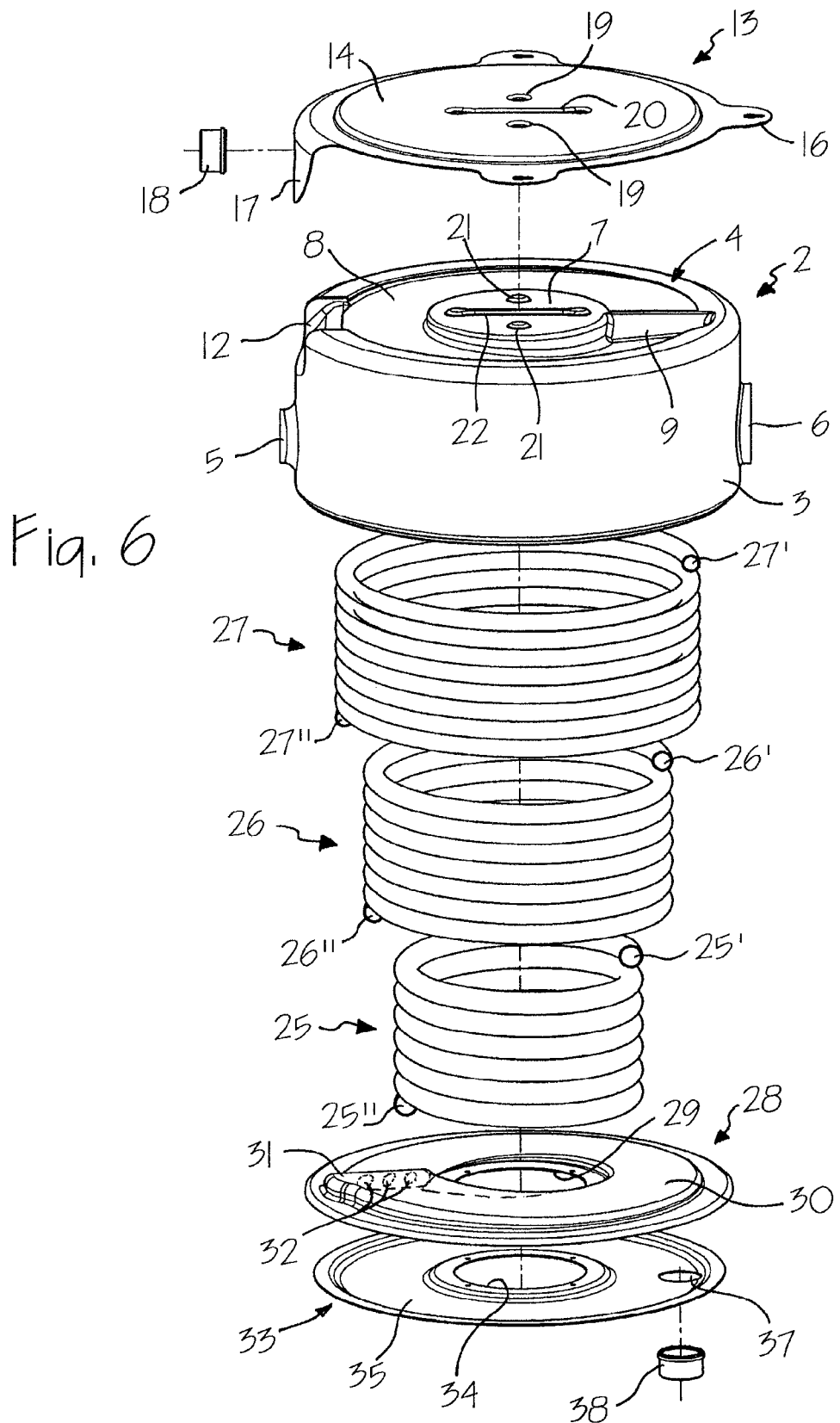
FIG. 6 is an exploded view of the heat exchanger according to the invention.
Figure 7:
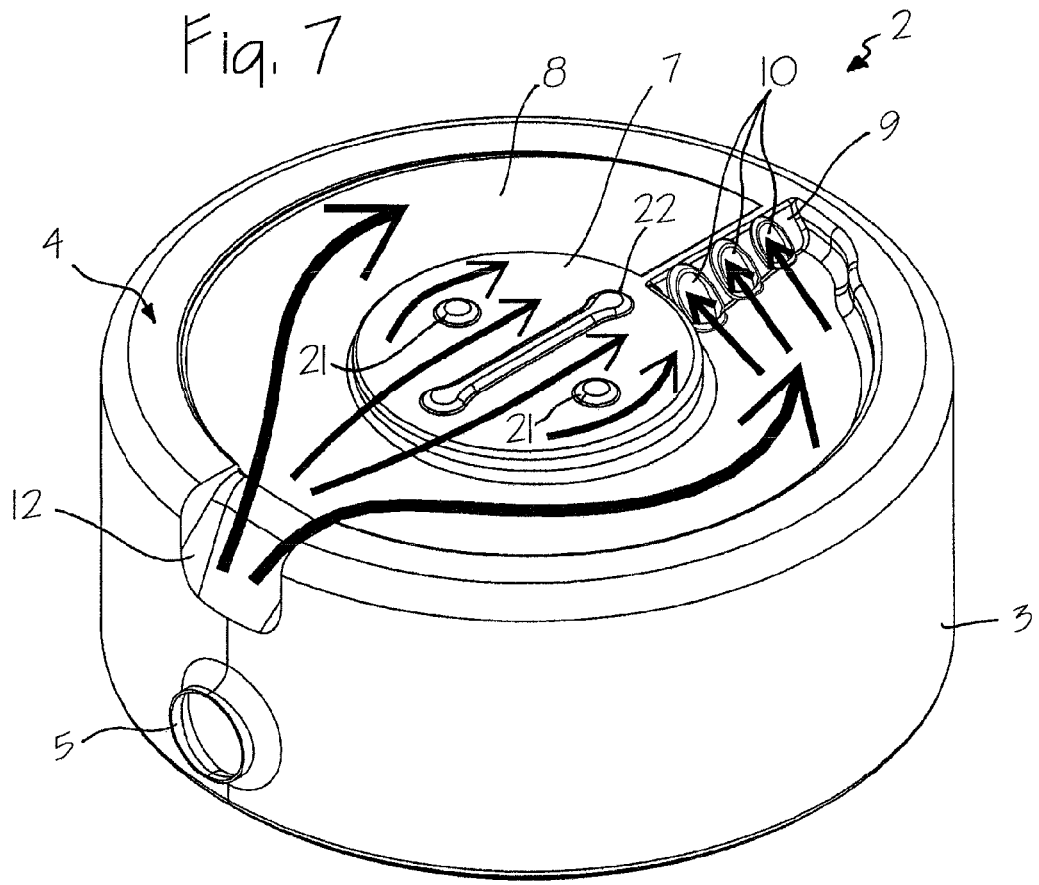
FIG. 7 is a perspective view of a first component of the heat exchanger of FIG. 6.
Figure 8:
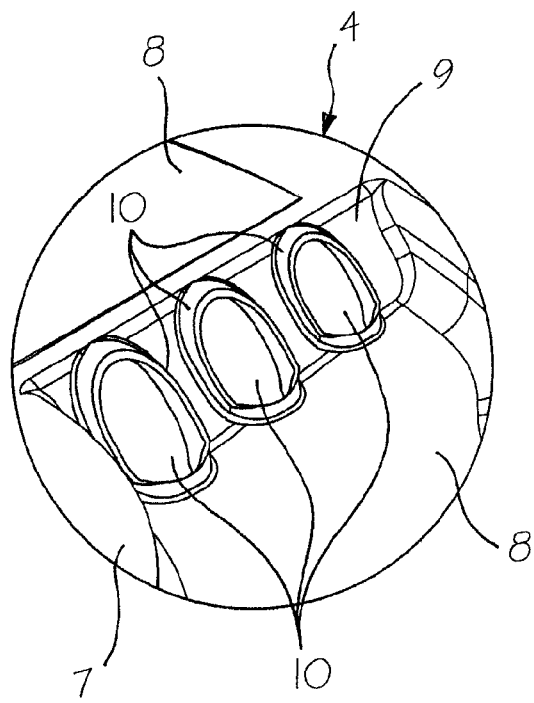
FIG. 8 is a detail of the component of FIG. 7.

As may be seen, in particular in FIGS. 6 and 7, the end wall 4 has a central area 7, around which there is formed, via drawing, an annular depression 8, facing the outside of the casing 2 and having a depth that is progressively variable in a circumferential direction. In other words, the area of the wall 4 that constitutes the bottom of the depression 8 develops substantially as a turn of a spiral, which starts and finishes in a position corresponding to a short inclined wall, designated by 9 in FIGS. 6, 7 and 8. At the wall 9, which forms a sort of "step" within the depression 8, there are defined three circular openings, designated by 10 in FIGS. 7 and 8, of different cross section. From the aforesaid figures it may moreover be noted how the inclined wall 9, which is substantially plane, has different heights in its two longitudinal end areas, and in particular a greater height in the direction of the portion 7 of the wall 4 and a smaller height in the direction of the peripheral part of the wall 4 (and in any case, as will emerge hereinafter, a greater height at the opening 10 for the pipe 25 and a smaller height at the opening 10 for the pipe 27).

Figure 12:
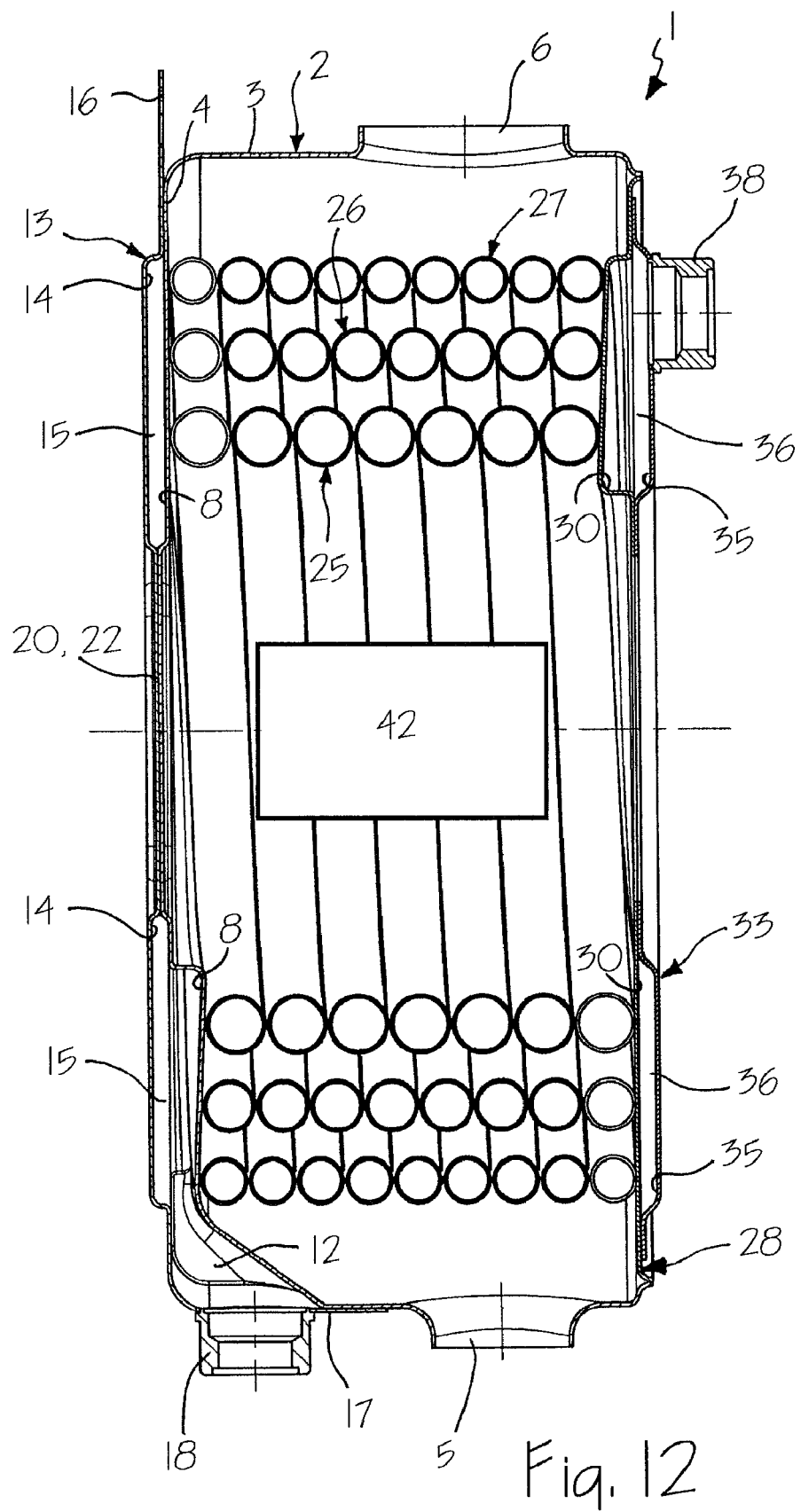

From FIGS. 6, 7 and 12 it may be noted how, in a corner area between the walls 3 and 4, in the bottom part of the heat exchanger 1, the casing 2 is drawn so as to present a recess 12, which communicates directly with the depression 8.

Fixed on the wall 4 is a closing flange or base plate, designated by 13, which is also made of thermally conductive material, for example via drawing of stainless steel sheet. In the base plate 13 there is formed a circular depression, designated by 14 in FIGS. 11 and 12, which faces in the direction of the depression 8 of the wall 4. Following upon coupling between the casing 2 and the base plate 13, the depressions 8 and 14 form a substantially toroidal interspace or gap, designated by 15 in FIGS. 11 and 12, having a section of passage that varies in a circumferential direction. In the upper part of the heat exchanger, the gap 15 is hence in communication with the openings 10 and in the lower part of the heat exchanger with the recess 12.

The base plate 13 is of an overall circular shape and provided at its periphery are radial portions 16 for fixing the heat exchanger 1, equipped with corresponding anchoring eyelets. A peripheral portion 17 of the base plate 12 extends in a way substantially orthogonal to the general plane of the base plate itself so as to close the recess 12. Present in said orthogonal portion 17 of the base plate 13 is a hole, associated to which, with modalities in themselves known, is an inlet connector 18 for a fluid, which is supposed herein as being a liquid to be heated. Formed in the central area of the base plate 13 are embossings 19, 20, which project within the depression 14 and are made to rest on corresponding embossings 21, 22, which rise from the central area 7 of the wall 4, as may be seen, for example, in FIG. 11.

Figure 11:
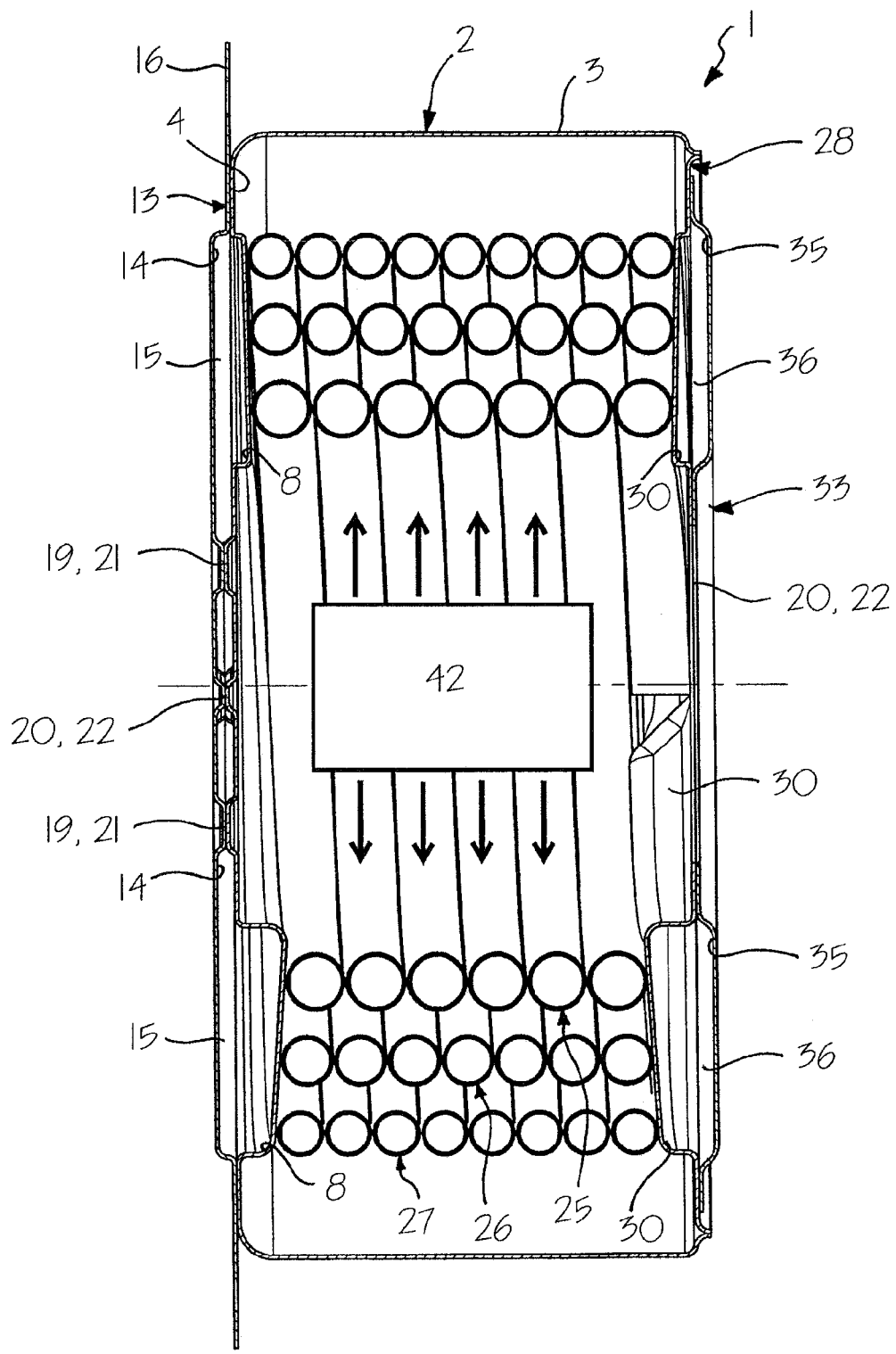
FIGS. 11 and 12 are two views in cross section of the heat exchanger according to the invention according to the line XI-XI of FIG. 3 and the line XII-XII of FIG. 5, respectively.

Within the casing 2 there is set a plurality of spiralled or coiled pipes, designated by 25, 26 and 27 in FIGS. 6, 11 and 12, which have prevalently circular sections of passage different from one another.

On the side opposite to the wall 4, associated in a fluid-tight way to the casing 2 is a second end wall, designated by 28 in the figures, which is provided with a central passage 29. The wall 28 has an annular depression, designated by 30 in FIGS. 6, 11 and 12, facing the outside of the casing 2, made in a way substantially similar to the depression 8 of the wall 4 and hence having a depth progressively increasing in a circumferential direction. Also the area of the wall 28, which forms the bottom of the depression 30 develops substantially in the form of a turn of a spiral, which starts and terminates in the area designated by 31 in FIG. 6, in which there is provided a short inclined wall similar to the one designated by 9 in FIGS. 7 and 8. In a position corresponding to said wall three openings are formed, designated as a whole by 32 in FIG. 6 and made in a similar way to the openings 10.

Fixed to the wall 28 is a second flange or base plate, designated by 33, provided with a respective central passage 34. In the base plate 33 there is formed an annular depression, designated by 35 in FIGS. 6, 11 and 12, which faces in the direction of the depression 30 of the wall 28. Following upon coupling of the wall 28 in a fluid-tight way to the base plate 33, the depressions 30 and 35 form a substantially toroidal interspace or gap, designated by 36 in FIGS. 11 and 12, which has a section of passage that varies in a circumferential direction. Formed inside the bottom wall of the depression 35 is a hole 37, associated to which is a respective connector 38 for outlet of liquid. In the lower part of the heat exchanger 1, then, the gap 36 is in communication with the openings 32, whilst in the upper part of the heat exchanger it communicates with the connector 38.

According to an important aspect of the invention, the pipes 25, 26, 27 are arranged so that the respective spirals are coaxial and are designed to convey in parallel the fluid that is to be, for example, heated by the heat exchanger 1. For this purpose, the pipes 25, 26, 27 are connected between the gaps 15 and 36, formed at the two opposite side ends of the heat exchanger 1. For this purpose, in the embodiment illustrated, three distinct pipes 25, 26, 27 are provided, which are wound to form spirals with turns of different diameter, and in which the spirals can be arranged one inside another, preferably (even though not necessarily) in a coaxial way and at a distance from one another. Said pipes have first ends, designated by 25', 26', 27' in FIG. 6, each connected in a fluid-tight way in a respective opening 10 of the gap 15, and second ends 25", 26", 27", each connected in a fluid-tight way to a respective opening 32 of the gap 36.

The sections of the pipes 25, 26, 27 are different from one another, with the liquid that will thus flow therein in an amount proportional to their cross section. In particular, the pipes 25 and 27, i.e., the internal one and the external one of the set, have a larger section of passage and a smaller section of passage, respectively, the section of passage of the pipe 26 being intermediate between that of the pipes 25 and 27. As may be noted, in the case exemplified, the dimension in an axial direction of the spirals formed by the pipes 25, 26, 27 is different (basically, the spirals are of different height). As has been said, moreover, also the respective sections of passage are different, so that the pipe 27 has a number of turns greater than the pipe 26, the number of turns of which is in turn greater than that of the pipe 25.

Also the distance between the turns of each pipe 25, 26, 27 is different. Preferably, the turns of the internal pipe 25 are set at a greater distance from one another as compared to the distance between the respective turns of the other two pipes 26, 27. The external pipe 27 preferably has turns set at a smaller distance from one another than the intermediate pipe 26.

Figure 9:
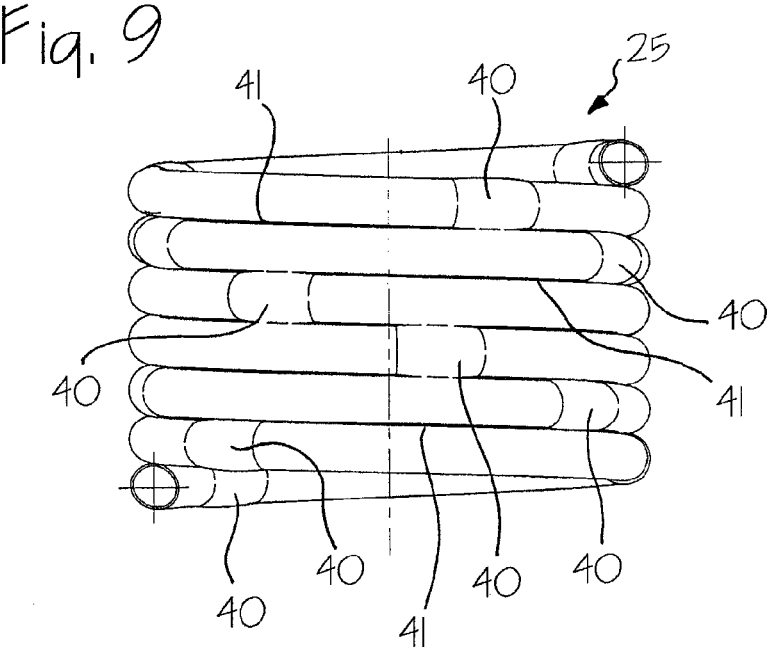
FIG. 9 is a perspective view of a second component of the heat exchanger of FIG. 6.
Figure 10:
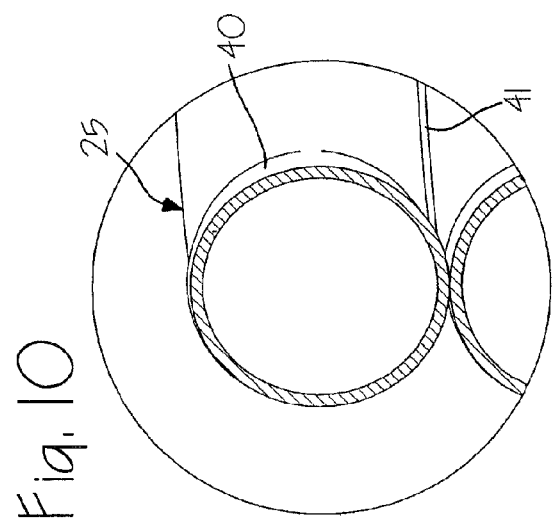
FIG. 10 is a cross-sectional view of a part of the component of FIG. 8.

Each coiled pipe has suitable means to keep the respective turns at the correct distance, which is preferably constant along the development of the pipe itself. In the embodiment exemplified, the aforesaid means are made up of localized portions of the same pipes, shaped to function as spacers. In FIG. 9, where only the pipe 25 is represented, the aforesaid spacer portions are designated by 40. Basically, as may be noted also from the detail appearing in the cross section of FIG. 10, in a position corresponding to each spacer portion 40 the cross section of the pipe is slightly ovalized in a direction parallel to the axis of the spiral, so that the portions 40 of one turn, which are in local contact with the surfaces of the adjacent bottom turn and top turn, enables an interstice or port, designated by 41 in FIGS. 9 and 10, to be defined between the turns themselves.

The pipe 25 is obtained starting from a normal tube with an initially circular cross section, for example made of stainless steel, and the spacer portions 40 are formed by rolling of said tube. In practice, the starting tube with circular cross section is first "squeezed" in order to bestow on it throughout its length the ovalized cross section that may be seen in FIG. 10, and subsequently is brought back into the original circular cross section, with the exception of the areas in which the spacer portions 40 are to be formed. Preferably, the spacer portions 40 are arranged at approximately 60° from one another along the development of a turn.

The aforesaid steps of rolling can be advantageously performed in the course of the same operation with which the tube is wound in a spiral, said operation being carried out with modalities in themselves known.

Even though the length, section of passage, and interstices 41 between the turns are different, the pipes 26 and 27 are produced with modalities similar to the ones described above with reference to the pipe 25.

The construction and assembly of the heat exchanger 1 is obtained according to the following procedure.

The bell-like casing 2 is produced by normal operations of shearing, pressing and drawing, starting from sheet metal preferably made of stainless steel. According to an advantageous aspect, the part of sheet metal that constitutes the inclined wall 9 is pre-formed, via pressing, so that the openings 10 present peripheral lips, designated by 10' in the detail of FIG. 8, so that the subsequent step of welding of the ends 25', 26' and 27' of the coiled pipes does not entail the use of added weld material and the fit is more tolerant to the imperfections of the machining operations.

Arranged coaxially within the casing 2 are the three coiled pipes 25, 26, 27, provided with the respective spacer portions 40, previously obtained via machining of a normal metal tube wound in a spiral, as described previously.

Figure 14:
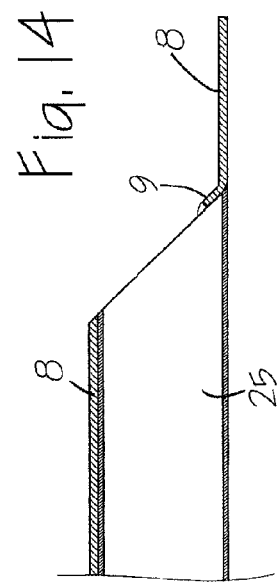
FIGS. 13 and 14 are two schematic sections that illustrate successive steps of reciprocal positioning between two components of the heat exchanger of FIG. 6.
Figure 13:
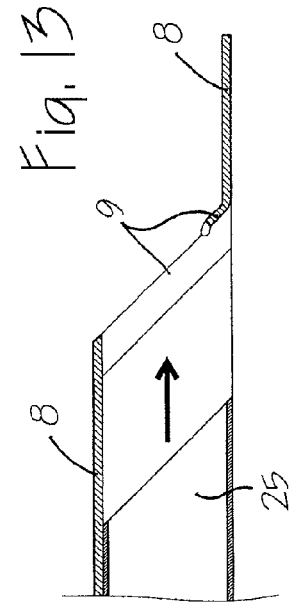

The ends 25', 26', 27' of the pipes 25, 26, 27 are then fixed in a fluid-tight way, preferably via TIG welding, to the respective openings 10. For this purpose, the pipes are cut at the aforesaid ends with an inclined cut, in order to enable better welding and less turbulence and loss of head of the fluid entering the gap 15. The cross-sectional views appearing in FIGS. 13 and 14 are schematic illustrations of successive steps of positioning of the end 25' with inclined cut of the pipe 25 at the respective opening 10 pre-formed in the wall 9, for the purposes of welding, it being taken for granted that similar operations are performed for the ends 26' and 27' of the pipes 26 and 27.

The base plate 13 is fixed in a fluid-tight way to the wall 4 of the body 2, preferably via laser welding, along the respective peripheral areas and at the embossings 19-20 and 21-22. In a position corresponding to the hole present in the portion 17 of the base plate 13 the respective connector 18 is fixed in a fluid-tight way.

The ends 25", 26", 27" of the pipes 25, 26, 27 are welded to the respective openings 32 present in the inclined wall 31 of FIG. 6, with modalities similar to the ones adopted for the ends 25', 26', 27' and described previously with reference to FIGS. 9, 13 and 14. The wall 28 is then fixed in a fluid-tight way to the casing 2, preferably via laser welding, in the respective peripheral areas.

Finally, the base plate 33 is fixed in a fluid-tight way to the wall 28, preferably via laser welding, in the respective peripheral areas and around the respective central passages 29, 34. The respective connector 38 is fixed in a fluid-tight way to the hole 37 of the base plate 33.

To the heat exchanger 1 thus formed there can next be associated a burner of a type in itself known, designated as a whole by 42 in FIGS. 11 and 12, preferably so as to be positioned inside the casing 2 and surrounded by the innermost coiled pipe 25. It should be noted that in any case the second heat-exchange fluid, instead of being produced by a burner set inside the casing 2, could come from a suitable external source, said fluid, in the form of a liquid or aeriform, being appropriately conveyed inside the casing of the heat exchanger 1 through the inlet opening formed by the passages 29, 34 of the wall 28 and of the base plate 33 and, in the case where said second fluid is a liquid, one of the connectors 5 and 6 may be omitted or re-closed. The aforesaid inlet opening could possibly be omitted or occluded, with the second fluid introduced into the heat exchanger through the connector 5 and expelled through the connector 6.

Operation of the heat exchanger 1 will now be described with reference to FIG. 12, assuming that the heat exchanger itself forms part of a gas boiler of a domestic type, in which the first heat-exchange fluid is a heating liquid that must be made to circulate in a system of radiators, and the second heat-exchange fluid is smoke produced by combustion.

The liquid returning from the system enters the heat exchanger 1 via the connector 18. The liquid, which has previously yielded heat to the aforesaid system, subsequently reaches the gap 15 through the recess 12 and proceeds upwards as far as the inlets 10 of the three pipes 25, 26, 27, as indicated schematically by the arrows in FIG. 7. By so doing, the liquid cools the respective side portion of the heat exchanger 1.

The liquid then penetrates into the three pipes 25, 26, 27 and passes through them, until it reaches the gap 36. Obviously, the length of the path followed by the liquid along the three pipes is different, given the different lengths thereof.

As a result of the three different sections of passage, and hence of the different flow rates, the liquid passes in an amount proportional to the capacity of heat exchange of the respective pipe 25, 26, 27, the three pipes operating at temperatures that are independent and decreasing with respect to one another, starting from the internal pipe 25, which is hotter, towards the external pipe 27, which is colder, thus favouring in a determining way the phenomenon of condensation of the fumes.

In other words, the liquid that passes through each pipe tends to absorb a different amount of heat, represented by the central arrows appearing in FIG. 11. The majority of the heat is absorbed by the innermost pipe 25, which absorbs also the heat generated by radiation by the burner 42, whilst the intermediate pipe 26 and the outermost pipe 27 absorb the residual energy of the fumes. As a result of the lower temperature of the pipes 26, 27 and of the variable passage for fumes (as mentioned, the interstices 41 between the turns of the pipe 25 are larger and those of the pipes 26, 27 smaller), it manages to absorb a very large amount of energy from the fumes, which are increasingly impoverished and, coming up against increasingly colder heating liquid, can condense effectively.

The fact that the three pipes 25, 26, 27 are at a distance from one another and that, by virtue of the different number of turns, the interstices of one pipe are staggered with respect to those of the next pipe, favours turbulence of the fumes and enables them to "break up", finding a number of different passages as they proceed towards the outermost pipe, which further improves the efficiency of heat exchange.

After passing through the pipes 25, 26, 27, the liquid reaches the gap 36, in the lower part of the heat exchanger 1, and then rises again as far as the delivery connector 38. Also in this case, even though it has absorbed heat, the liquid that rises in the gap 36 towards the connector 38 enables cooling of the respective side portion of the heat exchanger, which is very hot on account of the action of the burner 42.

The liquid leaving the connector 38 is then re-introduced into the system. The condensate that is generated within the heat exchanger 1 is collected and evacuated through the connector 5, and the residual fumes are expelled through the connector 6.

It should again be emphasized how, according to a further aspect of the invention, the bottoms of the depressions 8 and 30, formed by respective areas of the walls 4 and 28, have a progressively varying inclination. In particular, said bottoms are inclined with respect to a plane orthogonal to the axis of the spirals formed by the pipes 25, 26, 27. Said characteristic of the invention emerges clearly, for example, from FIGS. 11 and 12, where it may be noted how the distance that separates the bottoms of the depressions 8 and 30 from one another is smaller towards the centre of the heat exchanger and larger towards the outside of the heat exchanger. This enables the end turn of each pipe 25, 26, 27 to be kept in contact with the aforesaid bottoms of the depressions 8 and 30, even though the dimensions in an axial direction of the spirals formed by said pipes 25, 26, 27 are different. This enables a further increase in the heat exchange, with the gaps 15 and 36 which basically function as "additional" turns for the pipes 25, 26, 27.

From the foregoing description there emerge clearly the characteristics and advantages of the present invention.

The provision of coaxial spiralled pipes 25, 26, 27 set at a distance from one another, which have different cross sections and lengths and in which the first fluid flows in parallel, enables an extremely efficient operation of the heat exchanger 1 to be achieved thanks to the high heat exchange that is obtained by exploiting to the full the residual energy of the second fluid. Added to this, are the compact dimensions of the heat exchanger and the fact that there is no need for performing complex machining operations in order to obtain the pipes 25, 26, 27, which do not require plane surfaces.

The provision of the gaps 15, 36 enables cooling of the respective portions of the heat-exchanger body, whenever necessary, as well as an increase in the heat exchange.

The heat exchanger 1 can be entirely made using materials that can readily be recycled (preferably stainless steel) with the minimum of insulators made of fibre or the like. On account of the materials used, the operations involved in producing the heat exchanger are the simple ones of deformation and shearing of sheet metal.

The provision of a bell-like casing 2, obtainable in a single piece and thus avoiding long and costly welding operations, enables having available one or more connectors 5, 6, 18, which extend radially from the casing 2, and one or more connectors 38, which extend in an axial direction with respect to the casing, with consequent greater compactness as regards the overall dimensions of the heat exchanger.

The provision of gaps 15, 36 of variable cross section enables surfaces 9, 32 to be obtained for direct connection of the ends of the pipes 25, 26, 27, without any need to bend the ends themselves at right angles or to provide specific elements for corner connection, which once more is to further advantage in terms of compactness of the heat exchanger.

Finally, it should be noted that the construction of the bell-like casing 2 in a single piece, of the gaps 15, 16 with progressively increasing cross section, of the spacer portions 40 of the coiled pipes 25, 26, 27, as well as of the type of connection of the ends of said pipes, constitute individually solutions that can be adopted independently of the use of coaxial spiralled pipes set at a distance from one another, which have different cross sections, lengths and interstices between the turns, and are consequently solutions that may also form a specific subject of the present invention.

Of course, without prejudice to the principle of the invention, the details of construction and the embodiments may vary widely with respect to what is described and illustrated herein purely by way of example, without thereby departing from the scope of the present invention.

In the embodiment previously exemplified, the axis of the heat exchanger 1 is horizontal, but this is not to be considered binding or in any way limiting.

Even though the invention may be used to particular advantage for the production of condensation heat exchangers, as has been said it may also be used for producing other types of heat-exchange apparatus, in which the two heat-exchange fluids are of types and combinations different from what is exemplified above. In such a perspective, as has been said, a liquid could be introduced into the casing 2, or else a gas could circulate in the pipes 25, 26, 27 and in the gaps 15, 36, and so forth. The heat exchanger 1 according to the invention could be employed also to obtain cooling of a fluid, instead of heating thereof.

Figure 15:
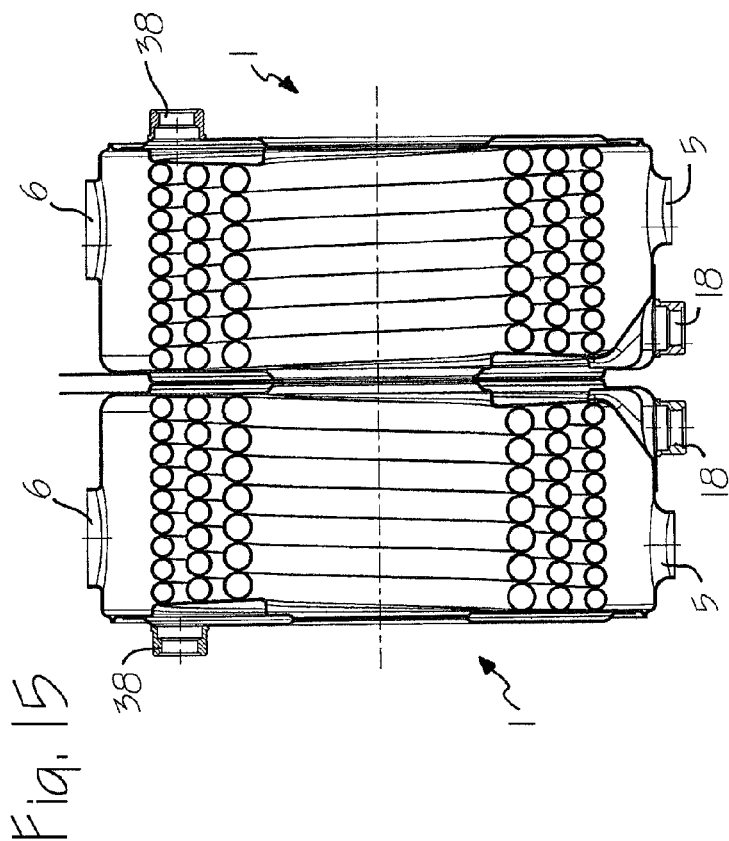
FIG. 15 illustrates a possible application of two heat exchangers built according to the invention.

FIG. 15 illustrates a possible mode of use of two heat exchangers 1 built according to the invention. As emerges clearly, by virtue of the construction of the overall bell-like casing and the radial arrangement of the connector 18, it is possible to combine a number of heat exchangers 1 together, i.e., associate them to the respective base plates 13, thus obtaining a single generator of higher power.

The invention claimed is:

1. A heat exchanger, comprising:
   a casing having at least one part of a path for passage of a first fluid within said casing, said path comprising at least one first pipe wound in a first spiral, the casing receiving a second fluid that is in a heat-exchange relationship with the first fluid;
   wherein said at least one first pipe is shaped to form a plurality of spacer portions on at least a first portion of said at least one first pipe that includes a first plurality of turns;
   wherein at least one turn of said plurality of turns comprises turn spacer portions, said turn spacer portions contacting at least one adjacent turn of said plurality of turns, such that an interstice is defined between said at least one turn and said at least one adjacent turn;
   wherein each turn of said plurality of turns comprises consecutive turn spacer portions spaced apart from each other in a length direction of each turn; and
   wherein each turn spacer portion of said turn spacer portions contacts said at least one adjacent turn at a first surface region of said at least one adjacent turn, said first surface region located between two consecutive adjacent turn spacer portions of said at least one adjacent turn, or each adjacent turn spacer portion of said at least one adjacent turn contacts said at least one turn at a second surface region of said at least one turn, said second region located between two consecutive turn spacer portions of said turn spacer portions of said at least one turn.

2. The heat exchanger according to claim 1, wherein said plurality of spacer portions comprise a plurality of ovalized portions of said at least one first pipe.

3. The heat exchanger according to claim 1, wherein said at least one pipe comprises a substantially circular shape between said consecutive spacer portions.

4. The heat exchanger according to claim 1, wherein said path comprises at least one second pipe wound in a second spiral, that connects, in parallel to the first pipe, a first area and a second area of said path, and wherein:
   the first pipe has a diameter of winding that is smaller than a diameter of winding of the second pipe;
   the first spiral is located within the second spiral, the first spiral and second spiral being set at a distance from one another.

5. The heat exchanger according to claim 4, further comprising at least one third pipe wound in a third spiral, that connects in parallel to the first and second pipes said first area and said second area of said path, and wherein:
   the second pipe has a diameter of winding that is smaller than a diameter of winding of the third pipe;

the second spiral is located within the third spiral, the second spiral and the third spiral being set at a distance from one another.

6. The heat exchanger according to claim 1, wherein the spacer portions have a height dimension in an axial direction of the first spiral and said interstice has a dimension in the axial direction of the first spiral corresponding to the eight of the spacer portions.

7. The heat exchanger according to claim 1, wherein said spacer portions consist of localized deformations of a tube forming said at least one first pipe being spaced apart from each other in a length direction of the respective turn.

8. The heat exchanger according to claim 1, wherein two said consecutive spacer portions of each turn are arranged at approximately 60° from one another along the turn.

9. The heat exchanger according to claim 1, wherein said path further comprises an interspace defined in at least one side wall of said casing, said interspace having a substantially toroidal shape and being delimited at least in part by a respective wall portion that develops in the form of a turn, which starts and terminates in an area of connection, in which area of connection at least one connection opening is formed for a respective ends of said at least one first pipe.

10. The heat exchanger according to claim 9, wherein said wall portion is inclined with respect to a plane orthogonal to the axis of the first spiral formed by said at least one first pipe.

11. The heat exchanger according to claim 9, wherein said area of connection comprises a substantially plane inclined wall, in particular lying on a plane that is transverse with respect to the plane of lie of said at least one side wall of the casing, said inclined wall having different heights in opposite longitudinal areas.

12. The heat exchanger according to claim 9, wherein said casing has a peripheral wall and an end wall formed in a single piece by a body made of a thermally conductive sheet.

13. A heat exchanger, comprising a casing, within which is present at least one part of a flow path for passage of a first fluid, said flow path comprising at least one pipe wound in a spiral, the casing being configured to receive a second fluid that is in heat-exchange relationship with the first fluid and including a peripheral wall and at least one side wall,
wherein said flow path further comprises at least an interspace defined in said at least one side wall of the casing, said interspace having a substantially toroidal shape and being delimited at least in part by a respective wall portion that develops in the form of a turn, which starts and terminates in an area of connection, in which area of connection at least one connection opening is formed for a respective ends of said at least one pipe.

14. The heat exchanger according to claim 13, wherein said wall portion is inclined with respect to a plane orthogonal to the axis of the spiral formed by said at least one pipe.

15. The heat exchanger according to claim 13, wherein said area of connection comprises a substantially plane inclined wall, in particular lying on a plane that is transverse with respect to the plane of lie of said at least one side wall of the casing, said inclined wall having different heights in opposite longitudinal areas.

16. The heat exchanger according to claim 13, wherein said at least one pipe is shaped to form a plurality of spacer portions on at least a portion of said at least one first pipe that includes a plurality of turns, each spacer portion having a height dimension in an axial direction of the spiral;
wherein spacer portions of at least one turn of said plurality of turns contact at least one adjacent turn of said plurality of turns, such that an interstice between said at least one turn and said at least one adjacent turn is defined;
wherein each turn of said plurality has a number of consecutive spacer portions that are spaced apart from each other in a length direction of the respective turn,
and wherein each spacer portion of said at least one turn contacts said at least one adjacent turn at a surface region thereof that is between two consecutive spacer portions of said adjacent turn, and each spacer portion of said at least one adjacent turn contacts said at least one turn at a surface region thereof that is between two consecutive spacer portions of said turn.

17. A heat exchanger, comprising:
a casing, within which is present at least one part of a flow path for passage of a first fluid, said flow path comprising at least one pipe wound in a spiral, the casing being configured to receive a second fluid that is in a heat-exchange relationship with the first fluid and including a peripheral wall and at least one side wall, the side wall being formed by an end wall and a closing plate mutually joined in a fluid-tight way; and
wherein the end wall has a central area surrounded by an annular depression having a bottom thereof formed by an annular portion of said end wall that develops substantially as a turn of a spiral starting and ending at an inclined wall portion, the inclined wall portion belonging to said bottom and extending in a radial direction from said central area to a peripheral part of the end wall.

18. The heat exchanger according to claim 17, wherein said casing comprises a body made of thermally conductive sheet defining in a single piece said peripheral wall and said end wall.

19. The heat exchanger according to claim 18, wherein in an edge region between said peripheral wall and said end wall a recess is formed in an outer part of said body, the recess directly communicating with said depression.

20. The heat exchanger according to claim 19, wherein the closing plate includes a main closing portion facing said depression of the end wall and an auxiliary closing portion extending substantially orthogonal to the main closing portion from an edge region thereof, such that the auxiliary wall portion faces the peripheral wall of said body to close said recess, the auxiliary closing portion having a fluid connector mounted thereon.

21. The heat exchanger according to claim 17, wherein said inclined wall portion has different heights at two longitudinal ends thereof.

22. The heat exchanger according to claim 21, wherein said inclined wall portion has a greater height at a connection region with said central area of the end wall and a smaller height at a connection region with said peripheral part of the end wall.

23. The heat exchanger according to claim 17, wherein said inclined wall portion has at least one through-opening for connection of an end of said at least one pipe.

24. The heat exchanger according to claim 23, wherein said at least one through-opening of said inclined wall portion has a peripheral lip at which said end of said at least one pipe is welded.

25. The heat exchanger according to claim 23, wherein said at least one pipe is cut at said end with an inclined cut and said inclined wall portion extends according to a plane having an inclination substantially similar to that of said inclined cut.

26. The heat exchanger according to claim 17, wherein said closing plate is coupled to said end wall to form with said depression a substantially toroidal chamber.

27. The heat exchanger according to claim 26, wherein said closing plate has a depression facing the bottom of the depression of the end wall.

28. The heat exchanger according to claim 17, wherein said central area of said end wall has a central through-passage and said inclined wall portion extends in radial direction from an edge of said central through-passage, said edge being defined in said central area, to a peripheral part of the end wall, and wherein said closing plate has a respective central through-passage.

29. The heat exchanger according to claim 28, wherein said inclined wall portion has a greater height at said edge of the central-through passage and a smaller height at a connection region with said peripheral part of the end wall.

30. The heat exchanger according to claim 28, wherein the closing plate has a respective depression having a bottom provided with a hole at which a fluid connector (38) is mounted.

31. The heat exchanger according to claim 17, wherein the end wall and the closing plate forming said side wall of the casing are mutually welded in a fluid-tight manner at respective peripheral areas.

32. The heat exchanger according to claim 17, wherein the at least one side wall comprises two side walls opposite to each other, each side wall of said side walls being at a respective axial end of the peripheral wall of the casing.

33. The heat exchanger according to claim 32, wherein a burner is positioned inside the casing, at an intermediate position between said two side walls, the burner comprising a burner body surrounded by said at least one pipe.

34. The heat exchanger according to claim 17,
wherein said at least one pipe is shaped to form a plurality of spacer portions, each spacer portion having a height dimension in an axial direction of the spiral formed by said at least one pipe;
wherein spacer portions of at least one turn of said plurality of turns contact at least one adjacent turn of said plurality of turns, such that an interstice between said at least one turn and said at least one adjacent turn is defined;
wherein each turn of said plurality has a number of consecutive spacer portions that are spaced apart from each other in a length direction of the respective turn,
and wherein each spacer portion of said at least one turn contacts said at least one adjacent turn at a surface region thereof that is between two consecutive spacer portions of said adjacent turn, and each spacer portion of said at least one adjacent turn contacts said at least one turn at a surface region thereof that is between two consecutive spacer portions of said turn.

35. The heat exchanger according to claim 17, wherein said flow path comprises at least one second pipe wound in a spiral, and wherein:
the diameter of winding of said at least one pipe is smaller than the diameter of winding of said second pipe;
the spiral formed by said at least one pipe is located within the spiral formed by the second pipe, the two spirals being set at a distance from one another.

36. The heat exchanger according to claim 35, wherein said flow path comprises at least one third pipe wound in a spiral, and wherein:
the diameter of winding of the second pipe is smaller than the diameter of winding of the third pipe;
the spiral formed by the second pipe is located within the spiral formed by the third pipe, the second pipe and the third pipe being set at a distance from one another.

37. The heat exchanger according to claim 35, wherein the spirals formed by said pipes at least one of:
are substantially coaxial to one another;
have a different dimension in an axial direction;
have a different number of turns; and
have interstices between the respective turns that are different for each pipe.

* * * * *